(12) United States Patent
Park et al.

(10) Patent No.: US 10,974,715 B2
(45) Date of Patent: Apr. 13, 2021

(54) HYBRID ELECTRIC VEHICLE AND DRIVING MODE CONTROL METHOD FOR THE SAME

(71) Applicants: Hyundai Motor Company, Seoul (KR); Kia Motors Corporation, Seoul (KR)

(72) Inventors: Joon Young Park, Seoul (KR); Sung Hoon Yu, Gyeonggi-do (KR); Jea Mun Lee, Seoul (KR); Jung Min Cha, Gyeonggi-do (KR); Ji Hoon Kang, Seoul (KR); Sung Deok Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 166 days.

(21) Appl. No.: 16/205,370

(22) Filed: Nov. 30, 2018

(65) Prior Publication Data
US 2019/0202438 A1   Jul. 4, 2019

(30) Foreign Application Priority Data
Dec. 28, 2017  (KR) .................. 10-2017-0182670

(51) Int. Cl.
*B60W 20/40* (2016.01)
*B60K 6/48* (2007.10)
(Continued)

(52) U.S. Cl.
CPC .............. *B60W 20/40* (2013.01); *B60K 6/48* (2013.01); *B60W 10/06* (2013.01); *B60W 10/08* (2013.01); *B60W 20/13* (2016.01); *B60K 2006/4825* (2013.01); *B60W 2510/244* (2013.01); *B60W 2530/16* (2013.01); *B60W 2554/00* (2020.02); *B60W 2710/088* (2013.01); *B60Y 2200/92* (2013.01)

(58) Field of Classification Search
CPC ........ B60W 20/40; B60W 20/13; B60W 6/48; B60W 10/06; B60W 10/08
USPC .......................................................... 701/22
See application file for complete search history.

(56) References Cited

U.S. PATENT DOCUMENTS

| 10,322,716 | B2 * | 6/2019 | Park | B60W 10/10 |
| 2009/0312895 | A1 * | 12/2009 | Kim | B60W 10/06 |
| | | | | 701/22 |

(Continued)

*Primary Examiner* — Peter D Nolan
*Assistant Examiner* — Wae L Louie
(74) *Attorney, Agent, or Firm* — Mintz Levin Cohn Ferris Glovsky and Popeo, P.C.; Peter F. Corless (57) ABSTRACT

A hybrid electric vehicle and a driving mode control method are provided to prevent overheating of an electric motor. The hybrid electric vehicle is chargeable using external power. The method includes collecting forward driving information when a state of charge of a battery is equal to or greater than a first value and calculating a driving load for each section based on the forward driving information. A risk of overheating of an electric motor is predicted using the calculated driving load. The vehicle is driven in a first mode using drive power of an engine in a section in which the predicted risk of overheating is greater than a second value and in a second mode using drive power of the electric motor in a section in which the predicted risk of overheating is equal to or less than a preset value.

19 Claims, 10 Drawing Sheets

(51) Int. Cl.
*B60W 10/06* (2006.01)
*B60W 10/08* (2006.01)
*B60W 20/13* (2016.01)

(56) References Cited

U.S. PATENT DOCUMENTS

| | | | |
|---|---|---|---|
| 2017/0259804 A1* | 9/2017 | Lee | B60W 30/186 |
| 2018/0170360 A1* | 6/2018 | Kim | B60W 20/40 |
| 2018/0201152 A1* | 7/2018 | Newman | B60L 53/14 |
| 2018/0215231 A1* | 8/2018 | Porras | B60H 1/00885 |
| 2019/0001960 A1* | 1/2019 | Lee | B60W 10/06 |
| 2019/0001962 A1* | 1/2019 | Park | B60K 6/52 |
| 2019/0001983 A1* | 1/2019 | Park | B60W 50/14 |
| 2019/0003835 A1* | 1/2019 | Jo | B60W 50/14 |
| 2019/0031182 A1* | 1/2019 | Park | B60W 20/13 |
| 2019/0126907 A1* | 5/2019 | Park | B60W 10/26 |
| 2019/0135268 A1* | 5/2019 | Lee | B60W 10/06 |
| 2019/0140578 A1* | 5/2019 | Lee | B60W 20/15 |
| 2019/0168730 A1* | 6/2019 | Park | F16H 63/42 |
| 2019/0176796 A1* | 6/2019 | Moon | F16H 61/0403 |
| 2019/0176822 A1* | 6/2019 | Cho | B60K 31/00 |
| 2019/0179335 A1* | 6/2019 | Cha | B60W 30/18 |
| 2019/0202438 A1* | 7/2019 | Park | B60W 10/08 |
| 2019/0344782 A1* | 11/2019 | Jeon | B60W 10/10 |
| 2020/0156480 A1* | 5/2020 | Park | H02P 23/0009 |

* cited by examiner

FIG. 1

RELATED ART

FIG. 2

RELATED ART

FIG. 3

RELATED ART

FIG. 4

RELATED ART

HYBRID ELECTRIC VEHICLE AND DRIVING MODE CONTROL METHOD FOR THE SAME

CROSS-REFERENCE TO RELATED APPLICATION(S)

This application claims the benefit of Korean Patent Application No. 10-2017-0182670, filed on Dec. 28, 2017, which is hereby incorporated by reference as if fully set forth herein.

BACKGROUND

Field of the Invention

The present invention relates to a hybrid electric vehicle and a driving mode control method for the same, and more particularly to a hybrid electric vehicle that prevents overheating of an electric motor and a control method thereof.

Discussion of the Related Art

In general, a hybrid electric vehicle (HEV) is a vehicle that uses two types of drive sources in a combined manner, and the two drive sources are mainly an internal combustion engine and an electric motor. Such a hybrid electric vehicle has excellent fuel efficiency and power performance, compared to a vehicle that is driven using only an internal combustion engine, and also advantageously reduces exhaust gases, and therefore, has actively been developed in recent years.

The hybrid electric vehicle may operate in two driving modes based on which powertrain is driven. One of the driving modes is an electric vehicle (EV) mode in which the vehicle moves using only an electric motor, and the other one is a hybrid electric vehicle (HEV) mode in which both an electric motor and an engine are driven to obtain power. The hybrid electric vehicle performs switching between the two modes based on detected driving conditions.

In addition to the classification of the driving modes based on the powertrain described above, for a plug-in hybrid electric vehicle (PHEV), driving modes thereof may be particularly classified into a charge-depleting (CD) mode and a charge-sustaining (CS) mode based on a change in the state-of-charge (SOC) of a battery. In general, the PHEV is driven by operating an electric motor with power of the battery in the CD mode, but mainly uses power of an engine in the CS mode to prevent a reduction in the SOC of the battery.

The PHEV is generally driven in the CD mode regardless of driving conditions such as a driving load, whether charging is possible, or the distance to a destination, and thereafter performs switching from the CD mode to the CS mode in the event of a reduced SOC. This will be described below with reference to FIG. 1.

Figure 1:
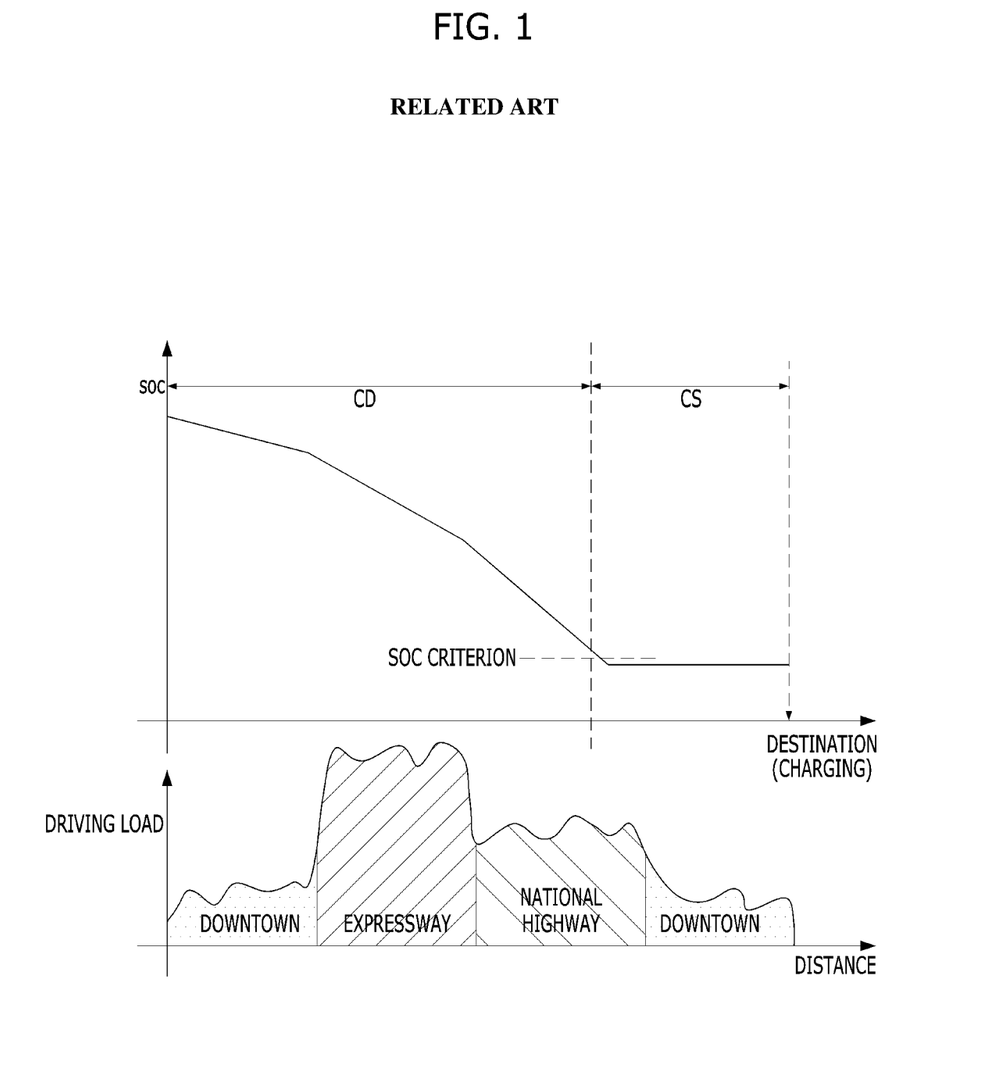
FIG. 1 illustrates an example in which a general plug-in hybrid electric vehicle performs switching between driving modes thereof according to the related art.

FIG. 1 illustrates an example in which a general plug-in hybrid electric vehicle (PHEV) performs switching between driving modes thereof. In FIG. 1, the horizontal axis represents the distance, the vertical axis of the upper graph represents the state of charge (SOC) of a battery of the PHEV, and the vertical axis of the lower graph represents the driving load.

Referring first to the lower graph in FIG. 1, there is a route in which downtown, national highway, and expressway sections are mixed between a point of departure and a destination, a driving load of the route being sequentially lower in the order of expressway-national way-downtown. When driving along this route, the PHEV begins in a CD mode at the time of departure without consideration to a change in the driving load, and then performs switching from the CD mode to a CS mode when the SOC of the battery is reduced below a preset reference.

Figure 2:
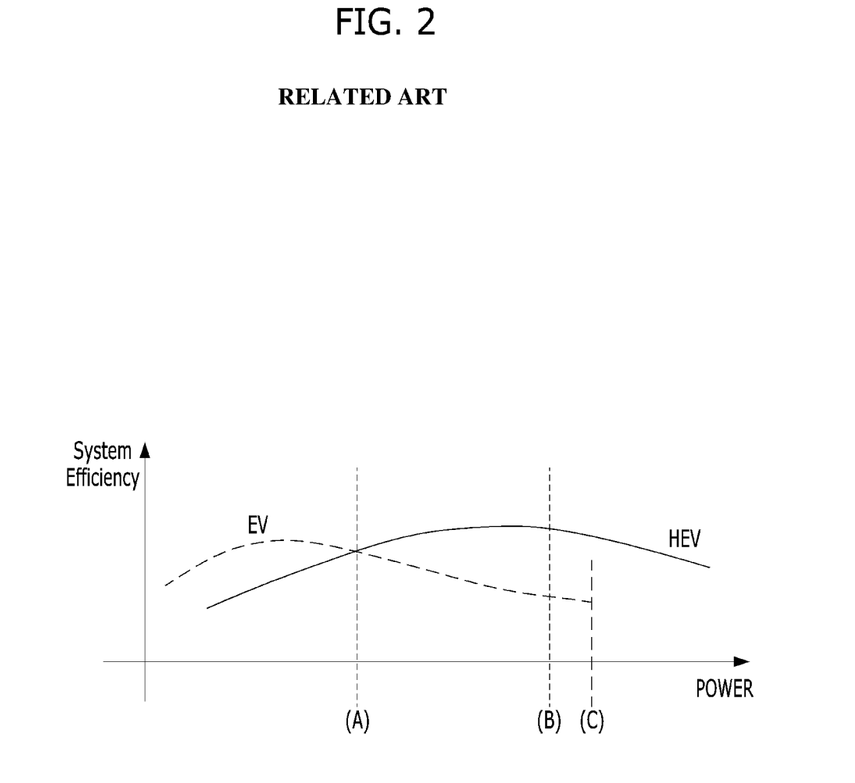
FIG. 2 is a view illustrating the energy efficiency characteristics of a powertrain of a general hybrid electric vehicle according to the related art.

The energy efficiency characteristics of such a hybrid powertrain will be described below with reference to FIG. 2. FIG. 2 is a view illustrating the energy efficiency characteristics of a powertrain of a general hybrid electric vehicle according to the related art. In FIG. 2, the horizontal axis represents the power of the powertrain and the vertical axis represents the system efficiency of the powertrain.

Referring to FIG. 2, EV-mode driving using an electric motor is efficient for a low-power period, but HEV-mode driving is more efficient after the point (A) at which the efficiency of an EV mode and the efficiency of an HEV mode intersect. In addition, the electric motor generally reaches the maximum power point (C) before an engine. Accordingly, the point (A) may be the criterion at which the engine is started in a CS mode, and the point (B) at which the efficiency of the HEV mode becomes the maximum may be the criterion at which the engine is started in a CD mode.

The above-described driving mode control maximizes the maximum driving distance using only the electric motor (i.e. All Electric Range (AER)), and is advantageous for a driver with relatively easy access to charging and primarily performs short-distance driving since no fuel is used and no problem related to exhaust occurs during driving in a CD mode. However, since the purpose of the driving mode control is to increase the AER, and thus, engine startup is suppressed until the electric motor and the battery reach the limit of power, the electric motor may be overheated before the SOC of the battery is reduced to a preset value.

Figure 3:
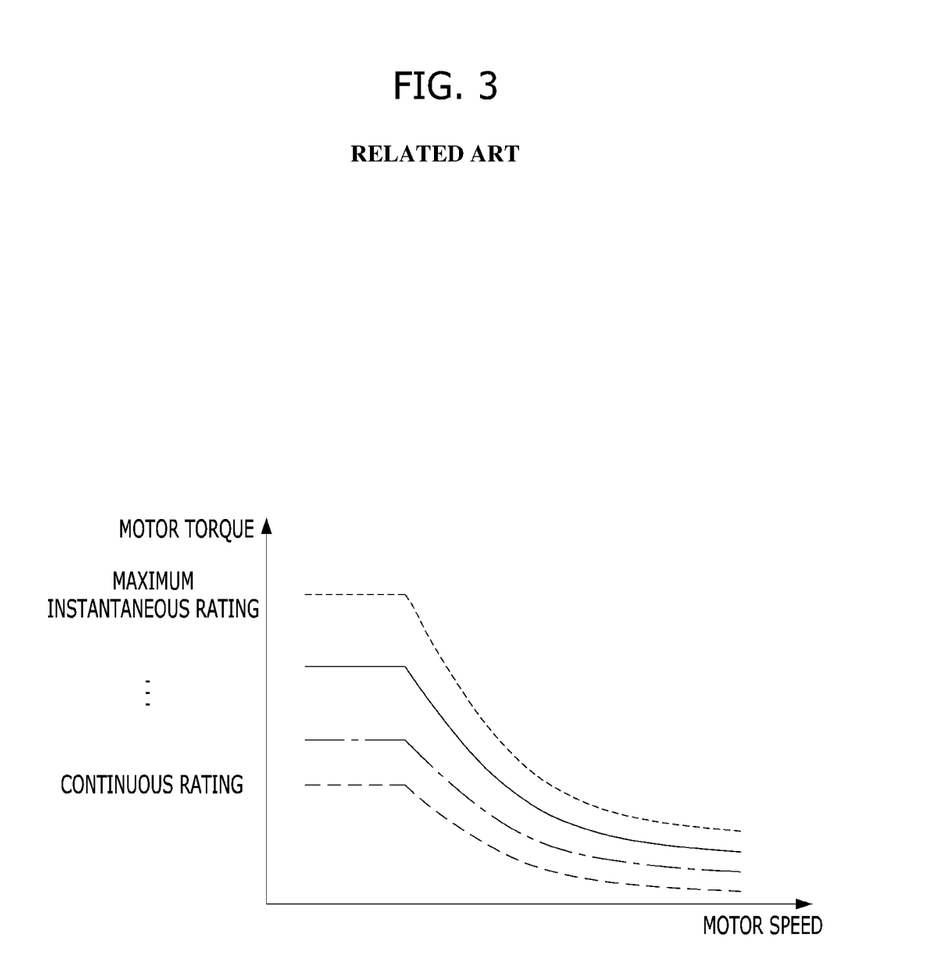
FIG. 3 illustrates the exemplary relationship between the speed and the rating torque of an electric motor mounted in a general hybrid electric vehicle according to the related art.

This will be described below with reference to FIG. 3. FIG. 3 illustrates the exemplary relationship between the speed and the rating torque of an electric motor mounted in a general hybrid electric vehicle according to the related art. In the graph illustrated in FIG. 3, the horizontal axis represents the speed of the electric motor (RPM) and the vertical axis represents the torque of the electric motor.

Referring to FIG. 3, the operating range of the electric motor may be broadly divided into a maximum instantaneous rating and a continuous rating. The criterion of this division may vary based on the amount of heat generated during operation and the capacity of a cooling system. Since the capacity of cooling is greater than the amount of heat at the continuous rating or lower, there is no risk of overheating of the electric motor even if the electric motor is continuously operated. However, the temperature of the electric motor may increase when the electric motor is operated for a long period of time above the continuous rating.

In the general hybrid electric vehicle, to maximally prevent engine startup in a CD mode, the criterion for transition from an EV mode to an HEV mode is set to be greater than the motor continuous rating, for example, in the vicinity of the maximum instantaneous rating. When the electric motor is overheated, the usage of the electric motor at given temperatures is limited to cool the electric motor. This limitation may be referred to as de-rating control and will be described below with reference to FIG. 4.

Figure 4:
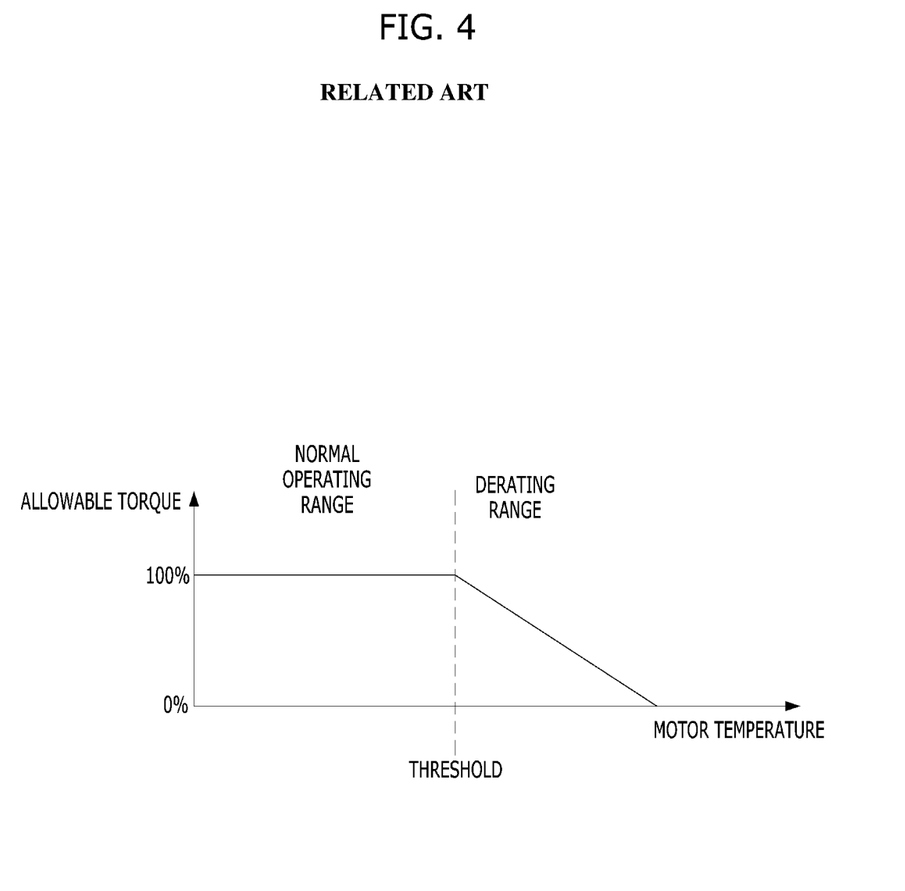
FIG. 4 illustrates the exemplary implementation of general de-rating control according to the related art.

FIG. 4 illustrates the exemplary implementation of general de-rating control according to the related art. In the graph illustrated in FIG. 4, the horizontal axis represents the temperature of the electric motor and the vertical axis represents the allowable torque of the electric motor. Referring to FIG. 4, the output torque is not limited in a normal operating range (e.g., the allowable torque is 100%), but the allowable torque decreases as the temperature of the electric motor increases in a de-rating range in which the motor temperature exceeds a threshold.

Fuel efficiency and operation performance are deteriorated when the torque of the motor is limited in the de-rating range. For example, when the torque is limited, regenerative braking is limited, and thus the recovery rate of energy is deteriorated. In addition, a reduction in output torque during EV-mode driving deteriorates driving efficiency, which causes deterioration in fuel efficiency. Moreover, since a torque assistance function of supplementing an engine torque with the torque of the electric motor is reduced in capability when the torque of the electric motor is limited, power performance, i.e. operation performance is deteriorated. Therefore, there is a demand for a mode-switching control method capable of preventing the occurrence of de-rating control and securing an AER.

SUMMARY

Accordingly, the present invention is directed to a hybrid electric vehicle and a driving mode control method for the same that substantially obviate one or more problems due to limitations and disadvantages of the related art. An object of the present invention is to provide a method of more efficiently performing mode-switching control and an eco-friendly vehicle which performs the method. In particular, an object of the present invention is to provide a method capable of securing a driving distance using an electric motor (i.e. All Electric Range (AER)) and preventing overheating of the electric motor and an eco-friendly vehicle which performs the method.

The technical objects to be accomplished by the present invention are not limited to the aforementioned technical objects, and other unmentioned technical objects will be clearly understood from the following description by those having ordinary skill in the art. Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mode-switching control method of a hybrid electric vehicle that is chargeable via external power may include collecting forward driving information when a state of charge of a battery is equal to or greater than a first value, calculating a driving load for each section based on the forward driving information, predicting a risk of overheating of an electric motor using the calculated driving load, driving in a first mode using drive power of an engine in a section in which the predicted risk of overheating is greater than a second value, and driving in a second mode using drive power of the electric motor in a section in which the predicted risk of overheating is equal to or less than a preset value.

In accordance with another aspect of the present invention, a hybrid electric vehicle may include an engine, an electric motor, a battery that is chargeable using external power and is chargeable and dischargeable by the electric motor, and a hybrid controller configured to collect forward driving information when a state-of-charge of the battery is equal to or greater than a first value, calculate a driving load for each section based on the forward driving information, predict a risk of overheating of the electric motor using the calculated driving load, execute driving in a first mode using drive power of the engine in a section in which the predicted risk of overheating is greater than a second value, and execute driving in a second mode using drive power of the electric motor in a section in which the predicted risk of overheating is equal to or less than a preset value.

It is to be understood that both the foregoing general description and the following detailed description of the present invention are exemplary and explanatory and are intended to provide further explanation of the present invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, reference will now be made in detail to the exemplary embodiments of the present invention, examples of which are illustrated in the accompanying drawings, to allow those skilled in the art to easily understand and reproduce the exemplary embodiments of the present invention. The present invention, however, are not limited to the exemplary embodiments disclosed hereinafter and may be embodied in many different forms. In the following description of the exemplary embodiments of the present invention, a detailed description of known functions or configurations incorporated herein will be omitted when it may make the subject matter of the disclosure rather unclear. In the entire specification, similar elements are denoted by similar reference numerals.

In the entire specification, when an element is referred to as "including" another element, the element should not be understood as excluding other elements so long as there is no special conflicting description, and the element may include at least one other element. In addition, throughout the specification, parts denoted by the same reference numerals refer to the same elements.

Figure 5:
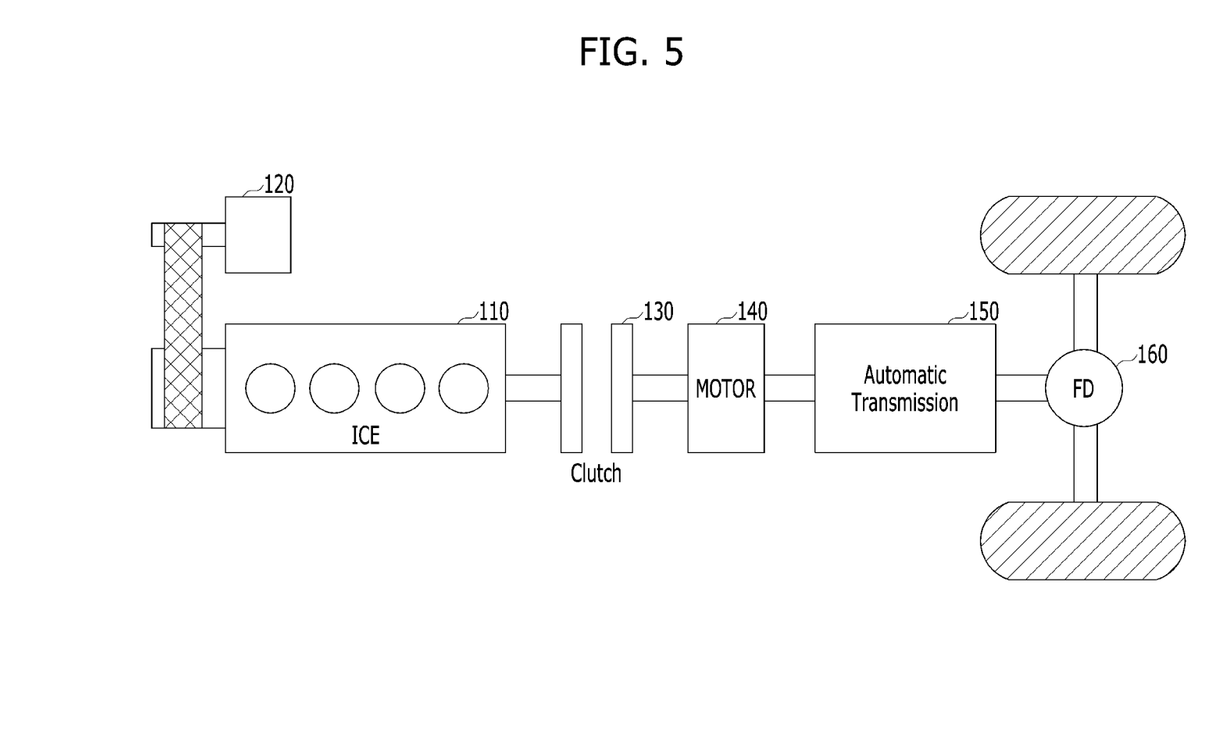
FIG. 5 illustrates an exemplary powertrain structure of a hybrid electric vehicle, to which exemplary embodiments of the present invention are applicable.

Prior to describing a mode-switching control method according to the embodiments of the present invention, the structure and the control system of a hybrid electric vehicle, to which the exemplary embodiments are applicable, will be described below with reference to FIGS. 5 and 6. FIG. 5 illustrates an exemplary powertrain structure of a hybrid electric vehicle to which the exemplary embodiments of the present invention are applicable.

Referring to FIG. 5, the powertrain of the hybrid electric vehicle is illustrated, which employs a parallel-type hybrid system in which an electric motor (or a driving motor) 140 and an engine clutch (EC) 130 are mounted between an internal combustion engine (ICE) 110 and a transmission 150. In such a vehicle, when a driver engages an accelerator pedal after starting, the motor 140 is first driven using power of a battery in the state in which the engine clutch 130 is opened, and power of the motor is transmitted through the transmission 150 and a final drive (FD) 160 to thereby move wheels (i.e. an EV mode). When the vehicle is gradually accelerated and requires greater drive power, an auxiliary motor (or a starter-generator motor) 120 may be operated to drive the engine 110.

Accordingly, when the rotational speeds of the engine 110 and the motor 140 become the same, the engine clutch 130 may be engaged and thus, both the engine 110 and the motor 140 may drive the vehicle or the engine 110 may drive the vehicle (i.e., transition from the EV mode to an HEV mode). When a preset engine-off condition, such as deceleration of the vehicle, is satisfied, the engine clutch 130 may be opened and the engine 110 may be stopped (i.e. transition from the HEV mode to the EV mode). In addition, the hybrid electric vehicle may charge the battery by converting the drive force of wheels into electricity during braking, and this is referred to as braking energy regeneration or regenerative braking.

The starter-generator motor 120 may be configured to operate as a starter motor when the engine is started, and as a generator motor during recovery of rotational energy of the engine after starting or turning off the engine. Therefore, the starter-generator motor 120 may be referred to as a "hybrid starter generator (HSG)", and may also be referred to as an "auxiliary motor" in some cases.

Figure 6:
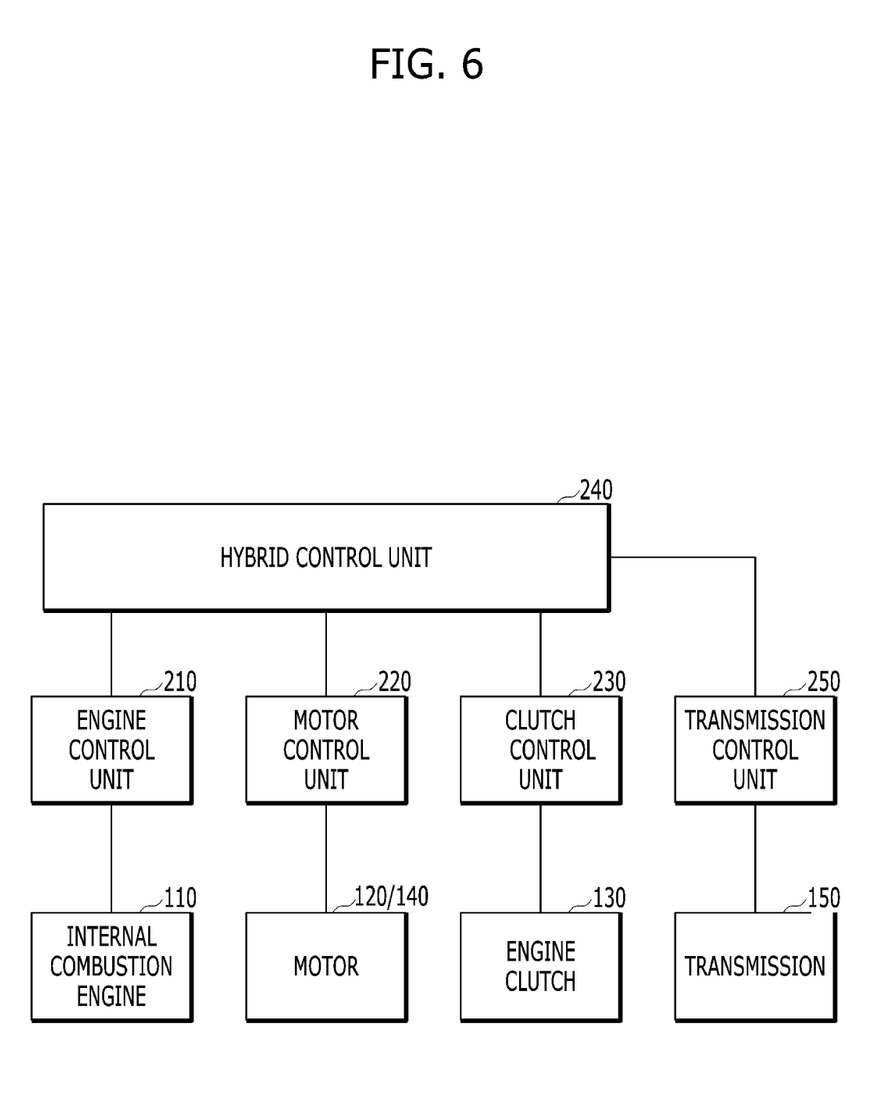
FIG. 6 is a block diagram of an exemplary control system of a hybrid electric vehicle, to which exemplary embodiments of the present invention are applicable.

The mutual relationship between controllers in the vehicle to which the above-described powertrain is applied is illustrated in FIG. 6. FIG. 6 is a block diagram illustrating an exemplary control system of a hybrid electric vehicle to which the exemplary embodiments of the present invention are applicable.

Referring to FIG. 6, in the hybrid electric vehicle to which the exemplary embodiments of the present invention are applicable, the internal combustion engine 110 may be operated by an engine controller 210, the torques of the starter-generator motor 120 and the electric motor 140 may be adjusted by a motor control unit (MCU) 220, and the engine clutch 130 may be operated by a clutch controller 230. In particular, the engine controller 210 may be an engine management system (EMS). In addition, the transmission 150 may be operated by a transmission controller 250. In some cases, a controller for the starter-generator motor 120 and a controller for the electric motor 140 may be provided separately.

The respective controllers may be connected to a hybrid control unit (HCU) 240, which is a superordinate controller configured to execute an overall mode switching process, and provide information to the hybrid controller (HCU) 240 required for driving mode switching, information required for engine clutch operation upon gear shifting, and/or information required for engine stop under the control of the hybrid controller 240, or may perform an operation in response to a control signal.

More specifically, the hybrid controller 240 may be configured to determine whether to perform mode switching based on the driving state of the vehicle. For example, the hybrid controller 240 may be configured to determine the point in time at which the engine clutch 130 is opened, and perform hydraulic control (in the case of a wet EC) or torque capacity control (in the case of a dry EC) when the engine clutch 130 is opened. In addition, the hybrid controller 240 may be configured to determine the state of the engine clutch 130 (e.g., the lock-up state, the slip state, or the opened state), and adjust the point in time at which the engine 110 stops fuel injection.

In addition, the hybrid controller 240 may be configured to transfer a torque command for adjusting the torque of the starter-generator motor 120 to stop the engine to the motor controller 220 to control the recovery of rotational energy of the engine. The hybrid controller 240 may be configured to operate a subordinate controller for the determination of a mode-switching condition and the implementation of mode switching during adaptive mode-switching control according to the exemplary embodiments of the present invention, which will be described below.

It will become apparent to those skilled in the art that the connection relationships between the controllers and the functions and identification of the respective controllers described above are merely given by way of example, and moreover that the respective controllers are not limited by the names thereof. For example, the hybrid controller 240 may be realized such that the function thereof is replaced with and provided by any one of the other controllers excluding the hybrid controller 240 and such that the function thereof is distributed to and provided by two or more of the other controllers.

Hereinafter, based on the above-described vehicle structure, a more efficient mode-switching control method according to an exemplary embodiment of the present invention will be described. An exemplary embodiment of the present invention proposes that forward driving information may be acquired and a driving load may be determined based on the acquired driving information, and thus, driving mode switching may be performed based on the result of predicating the possibility of de-rating using the profile of the driving load.

Figure 7:
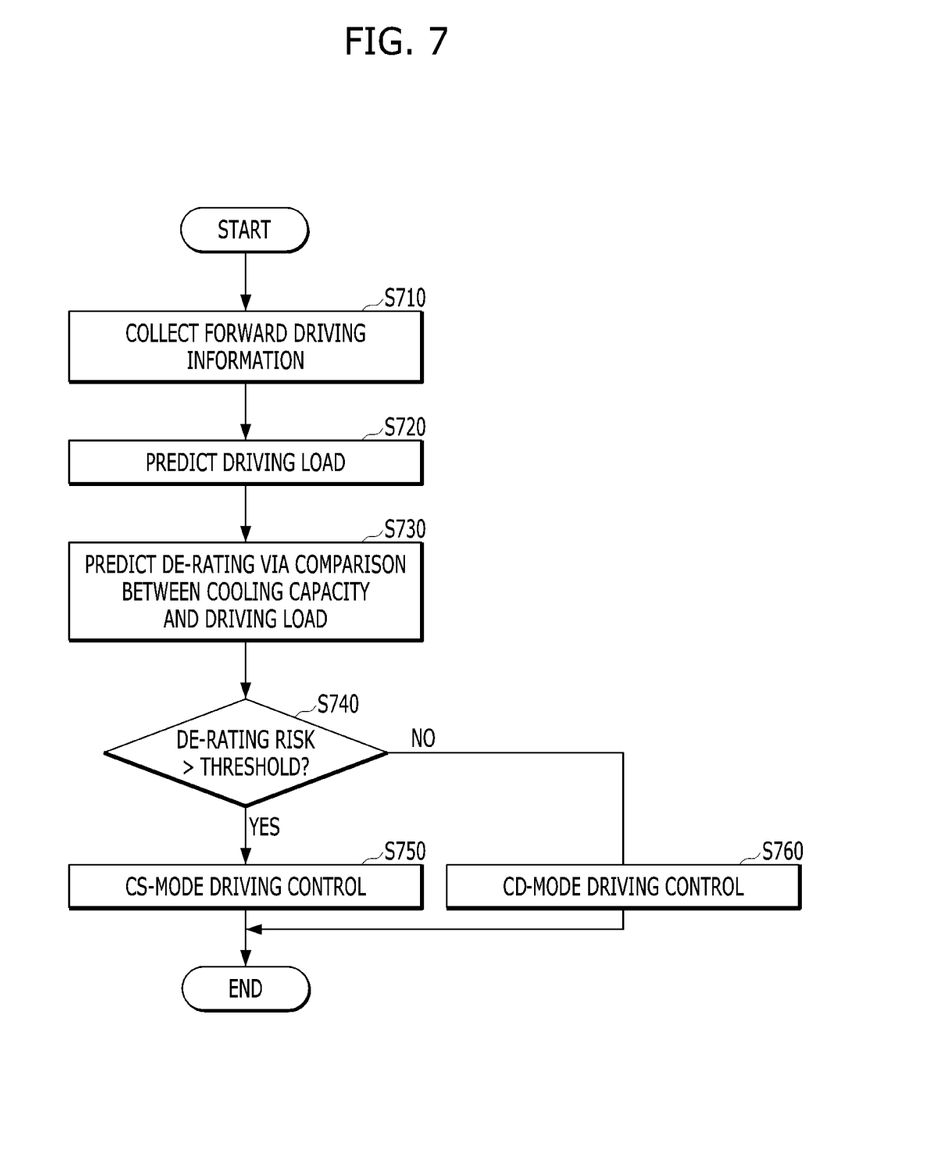
FIG. 7 is a flowchart illustrating an exemplary driving mode control method according to an exemplary embodiment of the present invention.

FIG. 7 is a flowchart illustrating an exemplary driving mode control method according to an exemplary embodiment of the present invention. Respective processes illustrated in FIG. 7 may be assumed to be performed by the hybrid controller for the convenience of description, but are not limited thereto. In addition, in FIG. 7, a situation in which CD-mode driving is performed is assumed. It is to be noted that the following processes may be performed when the SOC of a battery is equal to or greater than a predetermined value (e.g. the criterion of compulsory switching to a CS mode), although CD-mode driving may not be necessarily performed.

Referring to FIG. 7, first, forward driving information may be collected (S710). According to an aspect of the present exemplary embodiment, forward driving information may be navigation information. In particular, navigation information may include at least one of the type of a road, the gradient of a road, an average vehicle speed, or the degree of congestion (real-time traffic information). In general, navigation information may be acquired by a navigation system, i.e. an audio/video/navigation (AVN) system, without being necessarily limited thereto. For example, navigation information may be acquired from a telematics center via a telematics modem, may be acquired via data center/server/cloud connection using a wireless communication module, may be acquired from other vehicles via vehicle-to-vehicle (V2V) communication, or may be acquired via various in-vehicle sensors (e.g. a vehicle speed sensor or an adaptive driver assistance system (ADAS) radar).

An example of such navigation information is illustrated in the following Table 1.

TABLE 1

| Source | Grasped Information |
| --- | --- |
| Detailed map | driving route (driver's destination setting or learning) |
| Navigation system | road type, speed limit<br>gradient, turning radius/curvature<br>front static event (e.g. speed camera, tollgate, crossroad, or IC) |
| V2I | traffic congestion (traffic volume, maximum/minimum/average speed for each section) |
| Telematics | signal light information<br>front dynamic event (e.g., accident, construction, or ice formation) |
| V2V, Radar | short-distance traffic state acquisition |

When forward driving information is acquired, a driving load may be predicted for each section (S720). The prediction of the driving load may be performed in the manner illustrated in the following Table 2.

TABLE 2

| Factor | Content | Required Main Information | Calculation Example |
| --- | --- | --- | --- |
| Average Load | air resistance + gradient resistance + rolling resistance, etc. constant-speed driving load | average speed, gradient (average speed is estimated from speed limit, road type, traffic volume, etc.) | LoadAvg = Load(vavg) = ½ * Cd* ρ *A*vavg2 + m*g*sinθ + m * b *sign (vavg) |
| Change in Load | change in constant-speed driving load by change in speed, and change in load by acceleration/deceleration | maximum/minimum speed, average accelerated/decelerated speed (estimated from signal light information, average acceleration/deceleration, road type, traffic volume, etc.) | LoadVar = Load(vmax) − Load(vmin) + m * (acc-dec) |
| Operating Propensity | correct average load and change thereof by learning driver's driving pattern from past driving data (correct speed and accelerated/decelerated speed used for calculation of average load and change thereof) | difference from average speed, difference from average accelerated/decelerated speed (estimated from past driving data) | vavg = vavg + Δvdrv, vmax = vmax + Δvmax, vmin = vmin + Δvmin, acc = acc + Δacc, dec = dec + Δdec |

In Table 2, the respective values are defined as follows:— Cd: air resistance coefficient, p: air density, A: entire vehicle projection area, $V_{avg}$: average vehicle speed, m: vehicle mass, g: gravitational acceleration, 0: gradient, b: rolling resistance, $v_{max}$: maximum speed, $v_{min}$: minimum speed, acc: average accelerated speed, and dec: average decelerated speed; and—$\Delta v_{drv}$, $\Delta v_{max}$, $\Delta v_{min}$, $\Delta$acc, $\Delta$dec: driver's speed, accelerated/decelerated speed correction value.

When the driving load is predicted by the method illustrated in Table 2, de-rating prediction may be performed by comparing the predicted driving load with the capacity of cooling for the electric motor (S730). A detailed form of de-rating prediction will be described below with reference to FIGS. 8 to 10A-10B.

Figure 8:
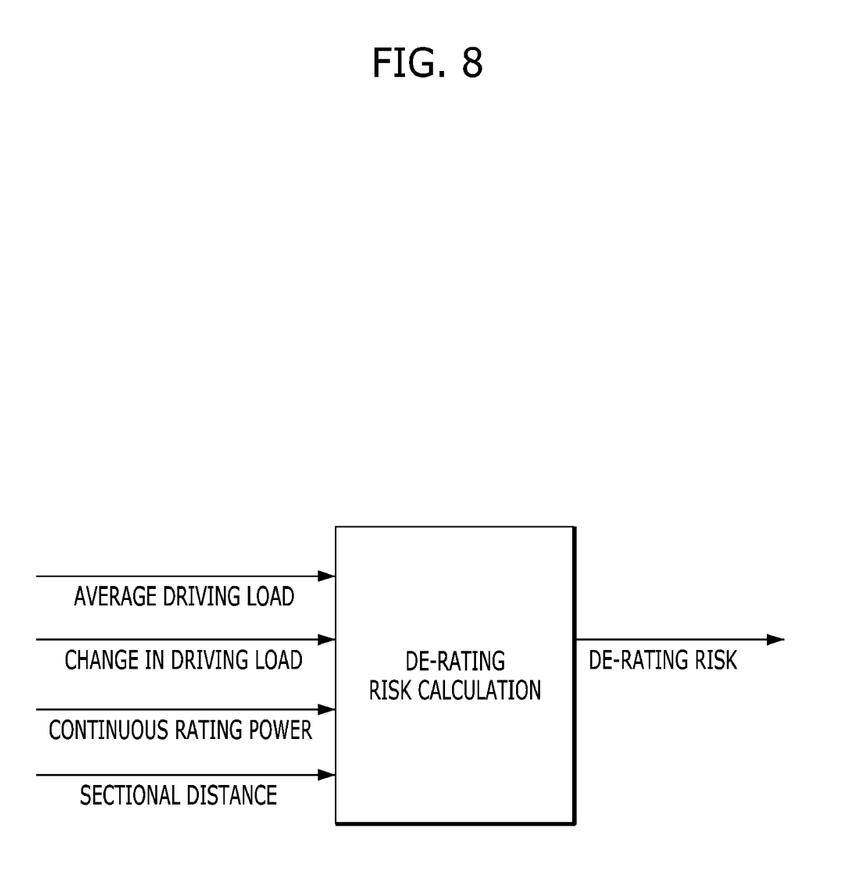
FIG. 8 illustrates an exemplary algorithm for calculating the risk of de-rating according to an exemplary embodiment of the present invention.
Figure 9:
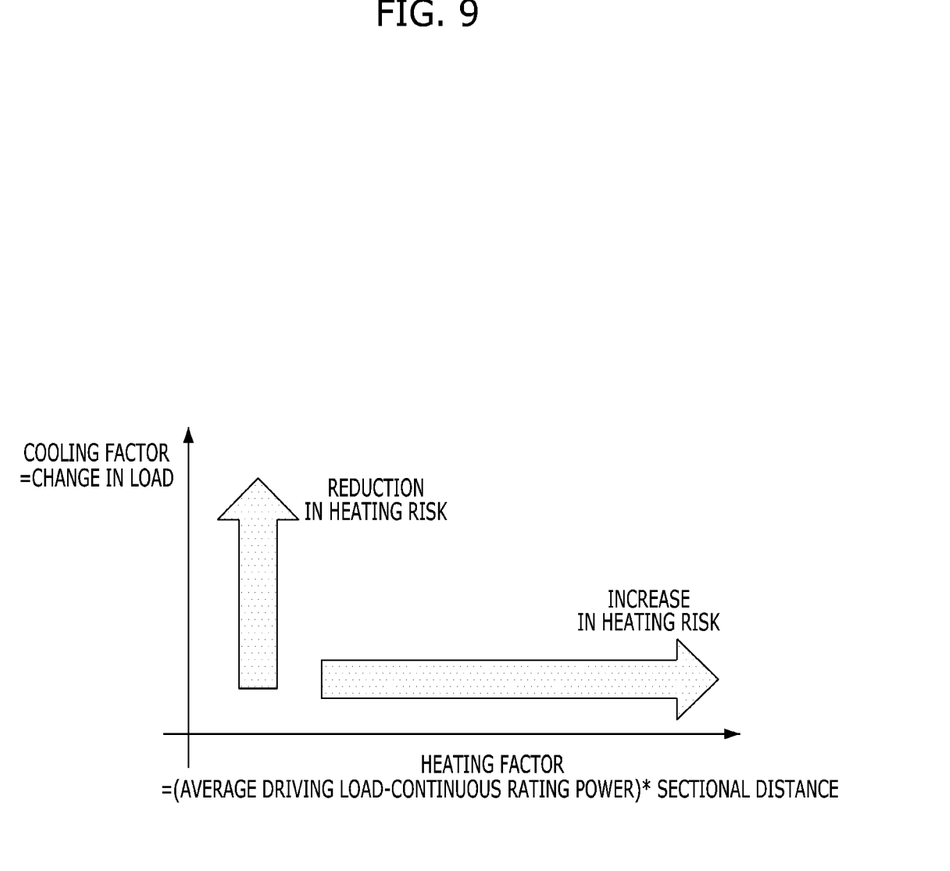
FIG. 9 illustrates the exemplary principle of defining a table for the calculation of the risk of de-rating according to the exemplary embodiment of the present invention.
Figure 10A:
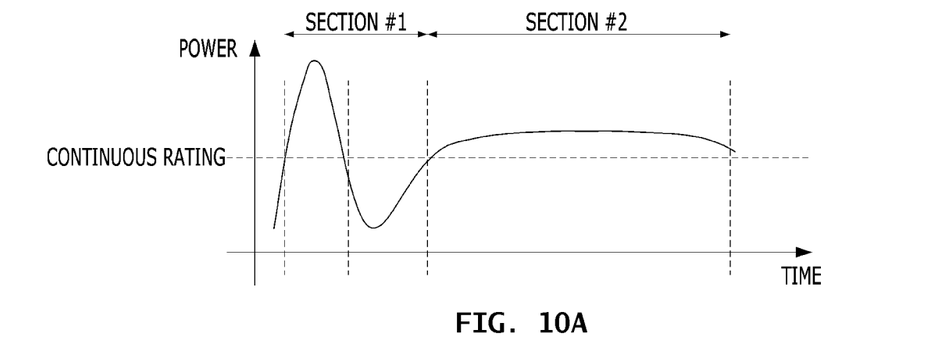
FIGS. 10A-10B illustrate the exemplary calculation of the risk of de-rating for each situation according to the exemplary embodiment of the present invention.
Figure 10B:
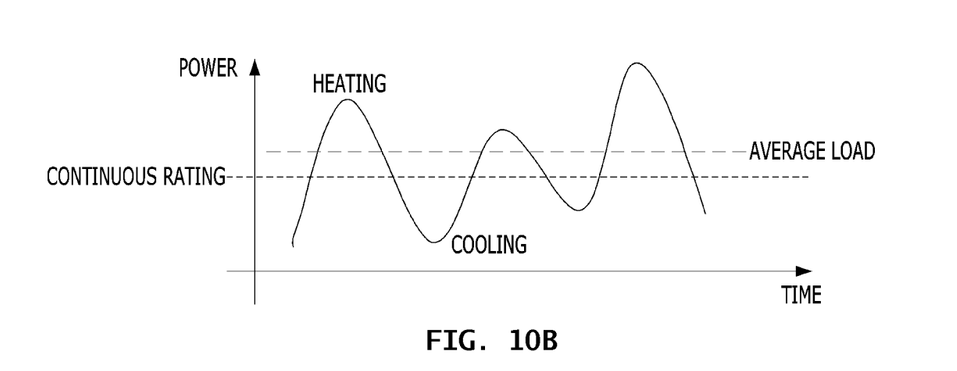

FIG. 8 illustrates an exemplary algorithm for calculating the risk of de-rating according to an exemplary embodiment of the present invention, FIG. 9 illustrates the exemplary principle of defining a table for the calculation of the risk of de-rating according to the exemplary embodiment, and FIGS. 10A-10B illustrate the exemplary calculation of the risk of de-rating for each situation.

First, as illustrated in FIG. 8, information regarding an average driving load, a change in driving load, continuous rating power, and a sectional distance may be considered for the calculation of the risk of de-rating. The average driving load and the change in driving load may be acquired by the method of Table 2 described above, and the continuous rating power may use a predetermined value for each vehicle. In addition, the sectional distance may refer to the length of a section that is determined based on a predetermined criterion for each category. The criterion of determining the section may be set in various ways by those skilled in the art, and thus, a detailed description will be omitted.

When calculating the risk of de-rating using the information illustrated in FIG. 8, a preset table may be referenced. For example, the table may be prepared by the principle of FIG. 9. Referring to FIG. 9, the risk of heating (i.e. the risk of de-rating) decreases as the cooling factor increases, and increases as the heating factor increases. Particularly, the cooling factor increases as the change in load increases and as the load decreases, and the heating factor increases in proportion to the distance along which a driving load greater than the continuous rating power continues.

For example, for the route illustrated in FIG. 10A, in a section #1, the maximum driving load is high, but there is a section in which cooling will be performed immediately after the maximum driving load, so that the section #1 shows a substantial change in load. On the other hand, in a section #2, the maximum driving load is relatively low, but a driving load greater than a continuous rating continues over a long distance. Therefore, the section #2 may have a greater risk of de-rating than the section #1. In another example, for the route illustrated in FIG. 10B, for the entire section, an average load exceeds a continuous rating, but a change in load is substantial and thus, a cooling section is present between high driving load sections. Thus, the risk of de-rating in the section may be minimal.

Referring back to FIG. 7, when the risk of de-rating for the section is calculated by the above-described method, is the calculated risk may be compared with a preset threshold (S740). When the risk of de-rating is greater than the preset threshold, switching to a CS mode may be performed (S750), and when the risk of de-rating is equal to or less than the preset threshold, CD-mode driving may continue (S760).

Through the above-described mode control method, in particular, the risk of de-rating due to overheating of a drive motor of an eco-friendly vehicle, more particularly, a PHEV may be reduced. With a reduction in the risk of de-rating, the loss of fuel efficiency due to limited regenerative braking or deterioration in EV-mode driving capability may be prevented and motor torque assistance capability may be maintained, which may result in enhanced power performance and operation performance. In addition, HEV-mode driving may be induced under a high load condition, which may result in an increased AER.

The present invention described above may be implemented as a computer readable code in a recording medium in which a program is stored. A non-transitory computer readable medium includes all types of recording devices in which data that is readable by a computer system is stored. Examples of the non-transitory computer-readable medium include a hard disk drive (HDD), a solid state disk (SSD), silicon disk drive (SDD), a ROM, a RAM, a CD-ROM, a magnetic tape, a floppy disk, and an optical data storage device.

As is apparent from the above description, an eco-friendly vehicle according to at least one exemplary embodiment of the present invention having the above-described configuration may more efficiently perform mode-switching control. In particular, since mode switching may be performed by predicting a de-rating situation based on a driving environment, it may be possible to secure the maximum driving distance using an electric motor while preventing overheating of the electric motor. The effects to be accomplished by the present invention are not limited to the aforementioned effects, and other unmentioned effects will be clearly understood from the above description by those having ordinary skill in the art.

The above detailed description should not be construed as being limited in all terms, but should be considered to be exemplary. The scope of the present invention should be determined by the reasonable interpretation of the accompanying claims, and all changes that fall within the range equivalent to the present invention should be understood as belonging to the scope of the present invention.

What is claimed is:

1. A mode-switching control method of a hybrid electric vehicle that is chargeable via external power, comprising:
   collecting, by a controller, forward driving information when a state-of-charge of a battery is equal to or greater than a first value;
   calculating, by the controller, a driving load for each section based on the forward driving information;
   predicting, by the controller, a risk of overheating of an electric motor using the calculated driving load;
   driving the vehicle, by the controller, in a first mode using drive power of an engine in a section in which the predicted risk of overheating is greater than a second value; and
   driving the vehicle, by the controller, in a second mode using drive power of the electric motor in a section in which the predicted risk of overheating is equal to or less than a preset value.

2. The method according to claim 1, wherein the first value corresponds to a criterion for compulsory switching from the second mode to the first mode.

3. The method according to claim 1, wherein the calculating of a driving load includes determining, by the controller, an average driving load for each section and a change in the average driving load.

4. The method according to claim 3, wherein the predicting of the risk of overheating is performed based on a cooling factor and a heating factor depending on the average driving load for each section, the change in the average driving load, continuous rating power of the electric motor, and a sectional distance.

5. The method according to claim 4, wherein the predicting of the risk of overheating is performed with reference to a table based on the cooling factor and the heating factor.

6. The method according to claim 4, wherein the cooling factor increases as the change in the average driving load increases, and the heating factor increases in proportion to a distance along which the average driving load is greater than the continuous rating power.

7. The method according to claim 3, wherein the forward driving information includes forward map information and traffic information.

8. The method according to claim 7, wherein the average driving load for each section includes a constant-speed driving load based on an average speed and a gradient, and the change in the average driving load includes a change in load due to a change in speed and acceleration and deceleration.

9. The method according to claim 1, wherein the first mode includes a charge-sustaining (CS) mode, and the second mode includes a charge-depleting (CD) mode.

10. A non-transitory computer readable recording medium in which a program for executing the mode-switching control method of the hybrid electric vehicle according to claim 1 is recorded.

11. A hybrid electric vehicle, comprising:
an engine;
an electric motor;
a battery that is chargeable using external power and is chargeable and dischargeable by the electric motor; and
a hybrid controller configured to:
  collect forward driving information when a state-of-charge of the battery is equal to or greater than a first value;
  calculate a driving load for each section based on the forward driving information;
  predict a risk of overheating of the electric motor using the calculated driving load;
  drive the vehicle in a first mode using drive power of the engine in a section in which the predicted risk of overheating is greater than a second value; and
  drive the vehicle in a second mode using drive power of the electric motor in a section in which the predicted risk of overheating is equal to or less than a preset value.

12. The hybrid electric vehicle according to claim 11, wherein the first value corresponds to a criterion for compulsory switching from the second mode to the first mode.

13. The hybrid electric vehicle according to claim 11, wherein the hybrid controller is configured to calculate the driving load for each section by determining an average driving load for each section and a change in the average driving load.

14. The hybrid electric vehicle according to claim 13, wherein the hybrid controller is configured to predict the risk of overheating based on a cooling factor and a heating factor depending on the average driving load for each section, the change in the average driving load, continuous rating power of the electric motor, and a sectional distance.

15. The hybrid electric vehicle according to claim 14, wherein the hybrid controller is configured to predict the risk of overheating with reference to a table based on the cooling factor and the heating factor.

16. The hybrid electric vehicle according to claim 14, wherein the cooling factor increases as the change in the average driving load increases, and the heating factor increases in proportion to a distance along which the average driving load is greater than the continuous rating power.

17. The hybrid electric vehicle according to claim 13, wherein the forward driving information includes forward map information and traffic information.

18. The hybrid electric vehicle according to claim 17, wherein the average driving load for each section includes a constant-speed driving load based on an average speed and a gradient, and the change in the average driving load includes a change in load due to a change in speed and acceleration and deceleration.

19. The hybrid electric vehicle according to claim 11, wherein the first mode includes a charge-sustaining (CS) mode, and the second mode comprises a charge-depleting (CD) mode.

* * * * *